(12) United States Patent
Schottland et al.

(10) Patent No.: US 12,636,865 B2
(45) Date of Patent: May 26, 2026

(54) OXYGEN BARRIER COATING AS A SEPARATION LAYER COATING

(71) Applicant: SUN CHEMICAL CORPORATION, Parsippany, NJ (US)

(72) Inventors: Philippe Schottland, Carlstadt, NJ (US); Glenn Webster, Northlake, IL (US)

(73) Assignee: Sun Chemical Corporation, Parsippany, NJ (US)

( * ) Notice: Subject to any disclaimer, the term of this patent is extended or adjusted under 35 U.S.C. 154(b) by 224 days.

(21) Appl. No.: 18/558,296

(22) PCT Filed: May 20, 2022

(86) PCT No.: PCT/US2022/030220
§ 371 (c)(1),
(2) Date: Oct. 31, 2023

(87) PCT Pub. No.: WO2022/246173
PCT Pub. Date: Nov. 24, 2022

(65) Prior Publication Data
US 2024/0217221 A1      Jul. 4, 2024

Related U.S. Application Data

(60) Provisional application No. 63/191,045, filed on May 20, 2021.

(51) Int. Cl.
B32B 27/08 (2006.01)
B32B 27/32 (2006.01)
(Continued)

(52) U.S. Cl.
CPC .............. B32B 27/08 (2013.01); B32B 27/32 (2013.01); B32B 27/36 (2013.01); B32B 37/12 (2013.01);
(Continued)

(58) Field of Classification Search
CPC ......... B32B 27/08; B32B 27/32; B32B 27/36; B32B 37/12; B32B 37/24;
(Continued)

(56) References Cited

U.S. PATENT DOCUMENTS

2011/0135958 A1      6/2011   Okada

FOREIGN PATENT DOCUMENTS

CN          112793272  A      5/2021
DE            4328016  A1      3/1994
(Continued)

OTHER PUBLICATIONS

Office Action issued in CN Application No. 202280036008.6 mailed Nov. 26, 2025, with English language translation thereof.
(Continued)

*Primary Examiner* — James C Yager
(74) *Attorney, Agent, or Firm* — Marian E. Fundytus; Amster Rothstein & Ebenstein LLP

(57) ABSTRACT

The present invention provides a recyclable laminate film structure comprising a separation layer coating. The separation layer coating facilitates separation of a selected polymer film during the recycling processing by selecting the polymer of the coating composition to have particular Hansen Solubility Parameters, so that the laminate structure delaminates at the layer of the coating, leaving clean pieces of the selected polymer film. In certain embodiments, the separation layer coating is a barrier coating, such as an oxygen barrier coating.

17 Claims, 5 Drawing Sheets

(51) Int. Cl.

| | |
|---|---|
| *B32B 27/36* | (2006.01) |
| *B32B 37/12* | (2006.01) |
| *B32B 37/24* | (2006.01) |
| *B65D 65/40* | (2006.01) |
| *C08J 5/12* | (2006.01) |
| *C08J 7/04* | (2020.01) |
| *C08J 7/048* | (2020.01) |
| *B29B 17/00* | (2006.01) |
| *B29B 17/02* | (2006.01) |

(52) U.S. Cl.
CPC .............. *B32B 37/24* (2013.01); *B65D 65/40* (2013.01); *C08J 5/124* (2013.01); *C08J 7/0427* (2020.01); *C08J 7/048* (2020.01); *B29B 2017/0015* (2013.01); *B29B 17/02* (2013.01); *B32B 2037/243* (2013.01); *B32B 2255/10* (2013.01); *B32B 2255/205* (2013.01); *B32B 2255/26* (2013.01); *B32B 2255/28* (2013.01); *B32B 2307/31* (2013.01); *B32B 2307/4023* (2013.01); *B32B 2307/412* (2013.01); *B32B 2307/7166* (2013.01); *B32B 2307/7244* (2013.01); *B32B 2307/748* (2013.01); *B32B 2439/40* (2013.01); *B32B 2439/70* (2013.01); *B65D 2565/385* (2013.01); *B65D 2565/387* (2013.01); *C08J 2323/06* (2013.01); *C08J 2323/12* (2013.01); *C08J 2367/02* (2013.01); *C08J 2377/00* (2013.01); *C08J 2429/04* (2013.01); *C08J 2479/02* (2013.01)

(58) Field of Classification Search
CPC ......... B32B 2037/243; B32B 2255/10; B32B 2255/205; B32B 2255/26; B32B 2255/28; B32B 2307/31; B32B 2307/4023; B32B 2307/412; B32B 2307/7166; B32B 2307/7244; B32B 2307/748; B32B 2439/40; B32B 2439/70; B32B 2329/04; B32B 2439/00; B65D 65/40; B65D 2565/385; B65D 2565/387; C08J 2323/06; C08J 2323/12; C08J 2367/02; C08J 2377/00; C08J 2429/04; C08J 2479/02; C08J 5/124; C08J 7/0427; C08J 7/048; B29B 17/02; B29B 2017/0015; B29B 17/0412; B29B 2017/0476; B29B 2017/0289; B29L 2009/00; B29L 2031/712
See application file for complete search history.

(56) References Cited

FOREIGN PATENT DOCUMENTS

| | | | |
|---|---|---|---|
| EP | 0569196 | A1 | 11/1993 |
| EP | 1476252 | A1 | 11/2004 |
| EP | 1707593 | A1 | 10/2006 |
| JP | H06047872 | | 2/1994 |
| JP | 201126532 | A | 2/2011 |
| JP | 2012071853 | A | 4/2012 |
| JP | 3219745 | U | 1/2019 |
| JP | 2020115157 | A | 7/2020 |
| JP | 2020175620 | A | 10/2020 |
| JP | 2020196855 | A | 12/2020 |
| WO | WO 2005/085381 | | 9/2005 |
| WO | WO2005/049710 | A1 | 6/2007 |

OTHER PUBLICATIONS

Synthesis and Application of Fine Chemical Products (2nd Edition), Cheng Lübai et al., pp. 98-99, Dalian University of Technology Press.
Fundamentals of Coatings, Jiang Yingtao, pp. 87-98, Chemical Industry Press.
International Search Report issued in International Application No. PCT/US2022/030220, mailed Sep. 6, 2022.
Written Opinion of the International Searching Authority issued in International Application No. PCT/US2022/030220, mailed Sep. 6, 2022.
International Preliminary Report on Patentability (Chapter 1 of the Patent Cooperation Treaty) issued in International Application No. PCT/US2022/030220, mailed Sep. 13, 2023.
Barry A. Morris, "The Science and Technology of Flexible Packaging" Elsevier, (2017).
Cole et al., "Adhesion between immiscible polymers correlated with interfacial entanglements." Macromolecules, 36: 2808-2815 (2003).
Vilmin, et al., "Interdigitation between surface-anchored polymer chains and an elastomer: Consequences for adhesion promotion." Europhysics Letters, 68(4): 543-549) (2004).
Hansen Solubility Parameters—A User's Handbok 2nd edition 2007 (Appendix A. Table A.2).
Office Action issued in JP Application No. 2023-571195 mailed Mar. 17, 2026, with English language translation thereof.

| PE or OPP |
| Separation layer coating #1 |
| Inks |
| Adhesive |
| Optional VM-Al layer |
| Separation layer coating #2 |
| PE or CPP |

| Film #1 (print web) |
| Inks |
| Adhesive |
| VM film |
| Adhesive |
| Separation layer coating |
| Film #2 (heat-sealable web) |

OXYGEN BARRIER COATING AS A SEPARATION LAYER COATING

CROSS REFERENCE TO RELATED APPLICATIONS

The present application is a § 371 National Phase application based on PCT/US2022/030220 filed May 20, 2022, which claims the benefit of U.S. Provisional Application No. 63/191,045, filed May 20, 2021, the subject matter of each of which is incorporated by reference in their entirety.

FIELD OF THE INVENTION

The present invention is in the field of recyclable flexible packaging. The present invention provides a recyclable laminate film structure comprising a separation layer coating. The separation layer coating facilitates separation of a selected polymer film during the recycling processing by selecting the polymer of the separation layer coating composition to have particular Hansen Solubility Parameters, so that the laminate structure delaminates at the layer of the separation layer coating, leaving clean pieces of the selected polymer film. In some embodiments, the separation layer coating may be a barrier coating, such as an oxygen barrier coating.

BACKGROUND OF THE INVENTION

Flexible packaging structures are varied. Different substrates offering different properties, which often means different chemistries, are available (see, for example, "The Science and Technology of Flexible Packaging" by Barry A. Morris (ed. Elsevier, 2017), in general). Appendix B (pages 697-709) illustrates the variety of packaging structures depending on the application, and some typical films used therein. Flexible packaging substrates may require additional coatings or layers to afford desired properties, such as adhesive layers, oxygen barrier layers, water vapor barrier layers, contaminant barrier layers, and the like.

Many laminated polymer film structures used for packaging applications are composed of multiple polymer layers, such as polyester, polypropylene, polyethylene, polyamide, and other polymers or co-polymers. The laminate structures may also include one or more metallized layers, such as an aluminum (Al) foil, or a thin layer of a metal oxide applied on the side of the films. The films are selected to allow the structure to meet the end use requirements of the laminate in terms of properties such as appearance, heat resistance, modulus, burst strength, puncture resistance, barrier properties, and heat seal strength. To meet the different needs for the inner and outer side of the packaging structure (e.g. burst strength and heat seal resistance on the outer side, and excellent heat seal strength on the inner side), laminate structures comprising chemically different and often chemically incompatible film materials are used. Such structures are not easily recyclable as they can be easily miss-sorted due to the multiple types of polymers, or the presence of a metal layer, and end up in landfill sites where they persist in the environment, or find their way to the oceans and contribute to plastic pollution. In some other structures which may be formed using film with identical or compatible chemistry (such as polyethylene or polypropylene), the presence of ink or adhesive may limit the reuse of the recyclate to heavily colored applications such as garbage bags or dark colored garden furniture.

WO 2005/085381 is directed to a pressure sensitive adhesive for attaching polymeric film labels to reusable containers. They provide a label composite structure that comprises: a backing layer that is a polymeric film, to which is applied a pressure sensitive adhesive layer for bonding the label onto the container. The pressure sensitive adhesive layer has an inner surface which faces and adheres to the backing layer, and an outer surface for adhering to the surface of the article. The pressure sensitive adhesive is heat-sensitive, and the peel strength of the label to the container decreases when heat is applied during the washing step. Prior to its application to the container, the outer surface of the adhesive layer is coated with an adhesive modifying agent. The adhesive modifying agent serves to reduce the adhesive strength of the adhesive layer in the region or regions at which the adhesive modifying agent is applied. The purpose of the adhesive modifying agent is to facilitate the lifting of the label edges in the washing bath, allowing the washing solution to penetrate behind the label and effect the washing off of the label. The chemical removal of the label is effected by the adhesive coming into contact with the hot washing fluid, allowing chemical interactions to take place between the washing solution and additives in the adhesive, such as surfactants. It is preferred that when the label is removed from the article, the adhesive layer remains captive on the label, thereby minimizing physical pollutants remaining with the washing machine.

Although the use of water removable adhesive layer in a laminate structure could be a potential approach to help recyclability by allowing the separation of the different substrates, the fact that the adhesive has to be applied over the inks means that the approach will not allow the recovery of a clear primary web after delamination.

Cole et al. discloses a chain scission model for scaling adhesion in polymeric composites in which the adhesion is entanglement-based. the polymer laminates are prepared by melt extruding or solvent method. The melted or solvated polymers mix across the interfacial region to produce entanglements. For multilayered polymers, entanglements provide the adhesion through physical bonds (Cole et al. (2003). Adhesion between immiscible polymers correlated with interfacial entanglements. *Macromolecules,* 36: 2808-2815).

Vilmin et al. study the adhesion between a crosslinked elastomer and flat solid surface where polymer chains have been end-grafted. They develop a partial-interdigitation model that allows one to analytically predict a critical surface grafting density beyond which only the thermal fluctuations allow the layer to interdigitate with the elastomer (Vilmin, et al. (2004).

Interdigitation between surface-anchored polymer chains and an elastomer: Consequences for adhesion promotion. *Europhysics Letters,* 68(4): 543-549).

For barrier coatings, the existing literature focuses on teaching how to create barrier coatings with improved barrier performance, enhanced adhesion to certain substrates (such as polyolefins) or how the combination of excellent barrier properties and high lamination bond strength can be achieved. Some references focus on barrier coatings with improved performance at higher relative humidity or enable the package to resist boiling conditions. Yet no reference is made as to how the properties of the barriers coatings (such as sensitivity to hot water) may affect the recyclability of articles, such as containers and flexible packaging.

SUMMARY OF THE INVENTION

The present invention provides a laminated polymer film structure comprising a separation layer coating, such as an oxygen barrier coating layer, which facilitates delamination of the structure during recycling to enable recovery of clean polymer film. Although the present invention is described with a focus on oxygen barrier coatings, it is to be understand that any type of coating layer can be used as a separation coating layer as long as it has the properties, as assessed by Hansen Solubility Parameters (HSP), as described herein. That is, the present invention is not limited to oxygen barrier coating layers.

In a particular aspect, the present invention provides a method of preparing a recyclable packaging laminate film structure, comprising:

(a) providing a first polymeric substrate and a second polymeric substrate, wherein the polymer of the first substrate has Hansen Solubility Parameters (HSP) of $\delta D_{s1}$ (dispersion), $\delta P_{s1}$ (polar), and $\delta H_{s1}$ (hydrogen bonding); and the polymer of the second substrate Hansen Solubility Parameters (HSP) of $\delta D_{s2}$ (dispersion), $\delta P_{s2}$ (polar), and $\delta H_{s2}$ (hydrogen bonding);

(b) applying and curing a separation layer coating composition onto the first polymeric substrate, wherein the separation layer coating composition comprises a polymer, wherein the polymer of the separation layer coating composition has HSP of $\delta D_c$, $\delta P_c$, and $\delta H_c$, and $Ro_c$ (radius of the sphere of solubility);

(c) wherein the distance between the polymer of the first polymeric substrate and the polymer of the separation layer coating composition $Ra_{(s1,c)}$ based on the HSP parameters of each polymer is 5 to 25, calculated according to the following equation (1):

$$Ra_{(s1,c)}^2 = 4 \times (\delta D_{s1} - \delta D_c)^2 + (\delta P_{s1} - \delta P_c)^2 + (\delta H_{s1} - \delta H_c)^2$$

(d) applying a lamination adhesive layer either on the same side as the separation layer coating or on the side of the second polymeric substrate; and (e) forming a laminate structure wherein the barrier coating and the adhesive are sandwiched between the first and second substrate;

wherein the formed laminate is suitable for sealing to itself or to a pre-formed rigid or flexible shape to create a package or container. Optionally, the separation coating layer may provide barrier properties to the structure such as oxygen barrier properties. Alternatively, the separation layer may be acting as a primer for the inks that would be printed over it to ensure their adhesion to the substrate during normal use of the flexible packaging.

In another aspect, the present invention provides a method of forming a laminated package or container, comprising providing the laminate film as described above, and sealing the laminate film structure to itself or to a pre-formed rigid or flexible shape to create a package or a container.

In a further aspect, the present invention provides a method of obtaining clean pieces of the first polymeric substrate during recycling, comprising:

(a) washing the laminate film structure of the present invention, or package or container comprising the laminate film structure, in a washing solution, wherein the washing solution has HSP of $\delta D_w$, $\delta P_w$, and $\delta H_w$;

(b) wherein the relative energy difference (RED) between the polymer of the separation layer coating and the washing solution is less than or equal to 1, according to equation (2):

$$RED_{c,w} = Ra_{(c,w)}/Ro_c$$

wherein $Ra_{(c,w)}$ is calculated according to equation (3);

$$Ra_{(c,w)}^2 = 4 \times (\delta D_c - \delta D_w)^2 + (\delta P_c - \delta P_w)^2 + (\delta H_c - \delta H_w)^2;$$

(c) wherein the RED between the polymer of the first polymeric substrate and the washing solution is greater than 1, according to equation (4):

$$RED_{s1,w} = Ra_{(s1,w)}/Ro_{s1}$$

wherein $Ra_{(s1,w)}$ is calculated according to equation (5);

$$Ra_{(s1,w)}^2 = 4 \times (\delta D_{s1} - \delta D_w)^2 + (\delta P_{s1} - \delta P_w)^2 + (\delta H_{s1} - \delta H_w)^2;$$

(d) separating the first polymeric substrate from the remaining layers of the package or container for recycling.

In a preferred embodiment, the RED between the washing solution and all polymeric film substrates in the laminate structure should be as large as possible—but at least greater than 1—so that the washing solution does not dissolve the polymeric film substrates.

In some embodiments, the washing solution is hot water or hot caustic solution (e.g. 1% to 3% NaOH in water), an organic solvent or blend of organic solvents, a blend of an aqueous solvent and an organic solvent, wherein each type of solvent optionally comprises a surfactant. In certain embodiments, the laminate film structure, or package or container comprising the laminate film structure, is shredded prior to the washing step.

Other aspects and advantages of the present invention will become apparent from the detailed description below.

DETAILED DESCRIPTION OF THE INVENTION

Figure 1:
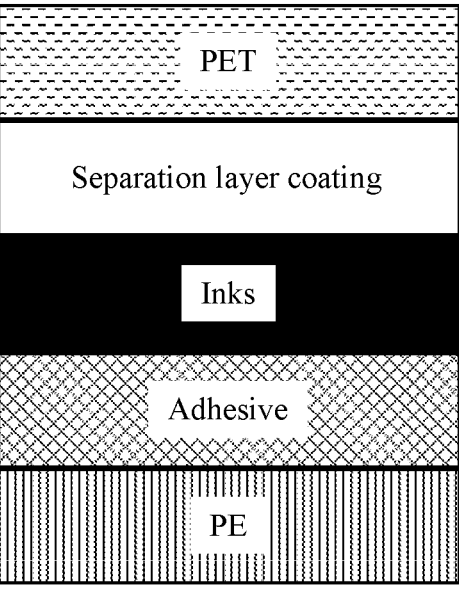
FIG. 1 illustrates a duplex laminate structure of the present invention.

The present invention provides a laminated polymer film structure comprising a separation layer coating as a separation layer coating, wherein the separation layer coating facilitates recycling by delaminating cleanly from the polymer substrate to which it is applied. The separation layer coating is formulated so that the polymer used as the resin in the coating is selected to have Hansen Solubility Parameters (HSP) within a specified distance of the HSP of the polymer of which the substrate is comprised. It is to be understand that, although the present invention is often described as a barrier coating, any type of coating can be used as a separation layer coating of the present invention.

It is to be understood that the foregoing general description and the following detailed description are exemplary and explanatory only, and are not restrictive of any subject matter claimed.

Headings are used solely for organizational purposes, and are not intended to limit the invention in any way.

Unless otherwise defined, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose. Although any methods and materials similar or equivalent to those described herein can be used in the practice or testing of the present invention, the preferred methods are described.

Definitions

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise. Also, when it is clear from the context in which it is used, "and" may be interpreted as "or," such as in a list of alternatives where it is not possible for all to be true or present at once.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

When the terms "consist of", "consists of" or "consisting of" is used in the body of a claim, the claim term set off with "consist of", "consists of" and/or "consisting of" is limited to the elements recited immediately following "consist of", "consists of" and/or "consisting of", and is closed to unrecited elements related to that particular claim term. The term 'combinations thereof', when included in the listing of the recited elements that follow "consist of", "consists of" and/or "consisting of" means a combination of only two or more of the elements recited.

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

It is to be understood that wherein a numerical range is recited, it includes the end points, all values within that range, and all narrower ranges within that range, whether specifically recited or not.

Throughout this disclosure, all parts and percentages are by weight (wt % or mass % based on the total weight) and all temperatures are in ° C. unless otherwise indicated.

As used herein, "substrate" means any surface or object to which an ink or coating can be applied. Substrates include, but are not limited to, cellulose-based substrates, paper, paperboard, fabric (e.g. cotton), leather, textiles, felt, concrete, masonry, stone, plastic, plastic or polymer film, spunbond non-woven fabrics (e.g. consisting of polypropylene, polyester, and the like) glass, ceramic, metal, wood, composites, combinations thereof, and the like. Substrates may have one or more layers of metals or metal oxides, or other inorganic materials. Particularly preferred are polymeric film substrates.

As used herein, the term "article" or "articles" means a substrate or product of manufacture. Examples of articles include, but are not limited to: substrates such as cellulose-based substrates, paper, paperboard, plastic, plastic or polymer film, glass, ceramic, metal, composites, and the like; and products of manufacture such as publications (e.g. brochures), labels, and packaging materials (e.g. cardboard sheet or corrugated board), containers (e.g. bottles, cans), a polyolefin (e.g. polyethylene or polypropylene), a polyester (e.g. polyethylene terephthalate), a metalized foil (e.g. laminated aluminum foil), metalized polyester, a metal container, and the like.

The term "laminate" or "laminated film" refers to film structures comprising at least a top film portion and a bottom film portion which are attached to each other either using an adhesive (water based, solvent based or solvent-free) or via extrusion lamination. The top film is generally referred to as the printing web or primary web and is reverse printed with coatings and inks before being laminated to the bottom substrate. The laminates could include more than two films in case of multi-ply structures. For flexible packaging applications such as pouches and sachets, the bottom film is designed to impart excellent heat sealing properties and has typically a lower Tg than the top film. The films used in the structure could be of the same chemistry (homogenous structures) or be different (heterogenous structures). For instance, a PET (polyethylene terephthalate) film laminated to a LDPE (low density polyethylene) film is an example of heterogenous structure, while a MDO-PE (machine direction orientation polyethelene) laminated to a LDPE film, or a BOPP (bi-axially oriented polypropylene) laminated to CPP (cast polypropylene) film are examples of homogenous structures.

As used herein, "separation layer coating" refers to a coating that is applied to a first polymeric film substrate, wherein the first polymeric substrate is laminated to a second polymeric substrate with the separation coating layer sandwiched between the polymeric substrates. A laminate structure may contain two or more polymeric substrates. Note that a separation layer coating may be applied to any or all of the polymeric substrates in a laminated structure. The separation layer coatings may be the same or different. The present invention is described in terms of an oxygen barrier coating, but it not so limited. A separation layer coating can be any type of coating. The separation layer coating is a delamination layer, facilitating recovery of the desired polymeric film substrate during recycling without contamination by other layers from the flexible packaging structure that are incompatible. The separation layer coating may also be referred to as "separation layer," "delamination layer coating," "delamination layer," or simply "coating."

Separation Layer Coating and Polymer Film Laminate Structure

The present invention provides a new application for functional separation layer coatings, which may be oxygen barrier coatings, to improve the sustainability of multi-layer laminated film structures, and especially structures comprising films of different chemical nature. The specially designed separation layer coatings enable the delamination during the recycling/reclaiming process (preferably in the hot water/hot caustic wash phase), thus allowing the films to be separated and directed towards compatible recycle streams to allow re-use. When the separation layer coatings are oxygen barrier coatings, they also improve the oxygen barrier performance of the films.

The separation layer coatings of the present invention are typically applied first down on a reverse printed web before the inks, and, therefore, will allow the separation of the clear primary web from the reverse printed ink layer in a multiply laminate structure. Structures based on the current invention employ a separation layer coating which can be applied during the printing converting steps of the structure, or, optionally, by the film supplier. When the separation layer coating is an oxygen barrier coating, the barrier coating layer not only reduces oxygen transmission through the package, but also enables the delamination of the structure when immersed in hot water and/or hot caustic solution. The separation layer coating can be applied to more than one surface to further help with the removal of reverse printed inks and/or adhesive layers present in the laminate to cleanly separate substrates which can then be recycled/re-used into a broader range of applications.

In one embodiment, the separation layer coating may be pattern applied in order to improve the resistance of the laminate structure to immersion into water during its useful shelf life. The pattern would preferably be registered to the printed graphics, and leave a gap with no coating between the cut edge of the final package and the beginning of the heat seal area.

Because the flexible packaging structure is typically shredded before being washed, the cut pieces would expose the separation layer coating to the hot water/caustic washing solution, or other type of washing solution, enabling delamination. Note that such exposure would not exist in the non-shredded structure because of the pattern printing. This option makes it possible to create more robust laminate structures with barrier properties while still enabling improved recyclability.

The coating is applied by flexographic, gravure, rollercoater, screen, spray, rod or bar, curtain, or other industrial printing or coating method, to a substrate comprising a flexible film or a multi-layer film structure. The coating is evaporatively dried, preferably by means of a thermal dryer attached to the printing or coating equipment, and may optionally undergo additional chemical hardening or crosslinking to increase its durability.

The coated layer of film is then laminated to one or more additional layers of film, either using a solvent-based or solvent-free adhesive or thermal extrusion lamination, to form a multi-layer packaging structure composed of a combination of two or more layers of film. The structure may optionally comprise a metalized film or foil and/or printing ink.

The separation layer coating of the present invention typically comprises a single or combination of water-soluble polymers or copolymers. Suitable polymers and copolymers include, but are not limited to, polyvinyl alcohol (PVOH), ethylene vinyl alcohol (EVOH), amorphous vinyl alcohol, polyacrylic acid, and/or polyurethane dispersions. Optionally, inorganic additives and fillers, such as mica, clays, and silicates, are dispersed in the coatings to enhance gas barrier properties. The barrier coatings of the present invention provide a 10 to 100 fold reduction in oxygen transmission rate (OTR), compared to uncoated film.

The coating composition is prepared by dissolving the soluble polymers in aqueous solution at room temperature, or with the addition of heat to accelerate the rate of solutioning. The barrier coating composition optionally contains non-aqueous solvents, such as alcohols, to promote efficient and effective, printing, coating, and drying. The coating composition may also comprise surfactants, or performance additives, such as surface wetting or defoaming additives, to further aid manufacturing and/or effective printing and application of the coating on the intended substrate and equipment of choice. The coating compositions may optionally comprise adhesion promoters, such as polyaziridine, polyethyleneimine (PEI), polyurethane polyol dispersions, organo-silanes, amino-silanes, acid-functional monomers or polymers, titanates, zirconates, or other chelating agent. The adhesion promoters promote adequate adhesion of the coating to the substrate film to produce the required bond strength in the laminated structure.

Examples of suitable PVOH, EVOH, and amorphous vinyl alcohol polymers include, but are not limited to, Exceval AQ-4104 (Kuraray Europe GmbH), Poval (Mowiol) 4-98 (Kuraray Europe GmbH), Aquaseal X2281 (Paramelt B.V., the Netherlands), and Nichigo G-Polymer (Mitsubishi Chemical Japan—distributed by Soarus L.L.C. USA). Examples of suitable modified PVOH copolymers include, but are not limited to, Gohsenx Z polymers, such as Z-100 and Z-200 acetoacetyl-modified PVOH (Mitsubishi Chemical), and amino-functional PVOH resins, e.g. polyvinylamine-co-polyvinylalcohol resins, such as Ultiloc 5003 (Sekisui Japan). According to the HSPiP database created by Charles Hansen, the HSP for non-functionalized PVOH are listed as the following: SD=15, SP=17.2, SH=17.8, and Ro=10.2. Although the actual values of the above polymers have not been experimentally determined, the polymers listed above are expected to have HSP values close to the literature values, with some experimental variations of ±3 units for each parameter.

Although the use of vinyl alcohol polymers and copolymers is typically preferred when the delamination step needs to occur in hot water, other barrier resins may be used if the conditions include, for instance, hot caustic solution, and in particular hot caustic with a powerful surfactant, as often used in plastics recycling plants, or even sorting facilities, during the washing cycle. In that case, materials such as barrier polyurethane dispersions may be used. An example of such material is the Takelac WPB-342(A) from Mitsubishi Chemical. Although polyurethane barrier coatings generally do not have intrinsic oxygen barrier properties as good as PVOH or EVOH, they do offer better moisture vapor barrier properties, and, in general, better hydrolytic stability, which could be helpful in packaging structures.

Examples of suitable mica, clay, and silicates include, but are not limited to, Cloisite Na+ (BYK-Altana Germany), and MicroLite 963 (SPV-Dicalite Management Group USA).

Additional components such as inorganic fillers, surfactants, catalysts, hardeners, or cross-linkers, may be combined in the coating formulation to produce a 1-pack "press-ready" coating, capable of being used on the printing or coating equipment without further modification. Alternatively, the additional components may be supplied separately as a "multi-part" coating consisting of one or more parts comprising the polymer solution or solutions, liquid dispersions of fillers and additives, and cross-linkers or catalysts, requiring the separate parts to be pre-mixed and blended together immediately prior to their use on the printing or coating equipment. The coating or coating parts when mixed prior to use, are preferably designed with optimal viscosity and drying capabilities for the intended printing or coating equipment, and additional performance properties to meet the demands of laminating and packaging converting equipment.

The laminated structure produced by incorporating the coating of the invention will preferably have sufficient lamination bond strengths to meet the requirements of the intended market application of the packaging, which may be different depending on the content, application, and end-use of the packaging.

The coating compositions may be optimized to "tune" the delamination properties, depending on the delamination conditions and desired performance of the structure under those conditions. For instance, the composition may incorporate a cross-linker to improve cold or warm water immersion resistance of the structure, and only enable delamination when the water reaches at least 65° C., preferably 75° C., or more preferably 85° C. The composition may also be optimized to allow faster delamination under such conditions, for instance by adjusting the glass transition temperature (Tg) of the resin components, and degree of cross-linking of the formulation. Lower Tg would allow faster delamination in hot water, while higher degree of cross-linking would make delamination more difficult and require more time or higher temperature, and may require the use of a surfactant and/or caustic in the washing solution to accelerate delamination. Note that higher temperature is generally helpful when the structure is based on materials which have different thermal expansion characteristics at that temperature, such as PET and PE films.

In a further embodiment, the coating may be pattern-printed or pattern-coated in such a way that the coated area of the substrate film excludes at least the outer part of the intended heat-seal areas around the edges of the packaging structure. This creates a thermally heat-sealable bag or pouch which does not delaminate when the unopened bag or pouch is unintentionally exposed to water, such as in a refrigerator or cooler. But when the recycled bag or pouch is chopped into small pieces, as required for plastic recycling, the pieces would still delaminate, and films separate as intended in the non-heat seal areas (where the coating was applied) when exposed to an aqueous or caustic solution at a plastics recycling facility. The pattern printed coating is generally registered with the printed graphics (of the ink layers). This method is in contrast to the typical method used to apply barrier coatings, wherein barrier coatings are generally flood coated.

In another embodiment, the technology of this invention may be used in combination with washable inks and/or removable adhesives, to further help isolate the various films used in the structure, without contamination from inks or adhesives. In that case, the inks and/or adhesive would be dissolved or very finely dispersed in the wash solution to allow the separation of the film pieces without residue and, if possible, the removal of the ink and/or adhesive particles from the wash solution so that water (or caustic solution with or without detergent, or other washing solution or medium) could be re-used in the washing process. This enables separation and recovery of the substrate film without ink contamination. The Solvawash™ line of washable inks from Sun Chemical is an example of such washable inks.

The present invention may be used to improve the barrier properties and recyclability of many multi-layer packaging structures, including vertically or horizontally formed pouches, sachets, trays, bars, and flow wraps. The final structure may be a flexible packaging structure, or comprise a combination of flexible packaging and rigid packaging, such as a container with a lid. Examples of such hybrid containers with lids include, for instance, fruit and vegetable trays with film-based lids, thermoformed trays (or containers) with a lid, and injection molded containers with a lid. Examples of thermoformed or injection molded containers include yogurt or dessert pot, capsules, or tea and coffee pods. In those hybrid constructions, the rigid container represents generally the largest weight fraction and the most valuable part to recycle, and is typically based on polyethylene terephthalate (PET), polypropylene (PP), or polystyrene (PS). However, if the lid is made with a non-compatible chemistry (e.g. hybrid polyester-polyolefin multilayer) and fails to be separated either by the consumer or during recycling, it could prevent the re-use of valuable thermoplastic resin. In such cases, the use of the present technology would be beneficial to either entirely remove the lid from the container so that it can be separated from the rigid fraction, or, if applicable, separate the non-compatible layers as done for the flexible packaging structure.

In its simplest form, the technology of the present invention may be used to create duplex barrier structures which can delaminate. In a further embodiment, structures may include a vacuum metallization layer, such as Al, AlOx, or SiOx. The structures may be a triplex or more complex structure. The separation layer coating which enables delamination should be strategically placed to provide the most meaningful split of the structure, in order to create the highest recycling yield and/or value. To that effect, some triplex structures are commonly seen in flexible packaging or lidding, which require high barrier properties. An example of such a triplex structure is PET/ink/adhesive/VM-PET/adhesive/LDPE, wherein VM-PET indicates a PET film with a vacuum deposited layer of Al, AlOx, or SiOx, and LDPE is low density polyethylene film. In such a structure, the barrier coating could be placed on the LDPE side facing the adhesive to separate it from the PET-based layers, which could then be treated separately. Some other structures may be more complex, such as OPA/ink/adhesive/VM-PET/adhesive/LDPE, where all the films would need to be separated ("OPA" is oriented polyamide film). In such a case, a separation layer coating should be preferably applied on all the layers, or, at a minimum, on the LDPE to at least help recover the LDPE by floatation.

Some polypropylene-based barrier structures are built using polyvinylidene chloride (PVdC)-coated oriented polypropylene (OPP). One example of such a structure is PVdC-coated OPP/ink/adhesive/VM-CPP, where VM-CPP represents vacuum deposited Al cast polypropylene film. Although the structure is a monomaterial structure because the film substrates are both based on polypropylene chemistry, it does not allow for easy recycling. In fact, the PVdC could contaminate the recyclate and create significant issues during recovery or re-use. The metallization also might be a problem in some instances. Using a structure based on the present invention, where the barrier coating of the invention can replace the PVdC (and impart equivalent or better oxygen barrier properties when measured at relative humidity of 50% or below) would provide significant benefits in terms of recyclability. First, a printable barrier coating may be used to coat the primary OPP film, and help the separation from the ink layer, while imparting the necessary barrier properties to the structure. Also, a second barrier coating may be applied on the CPP side facing the adhesive, so that ink and adhesive could be fully separated from OPP and VM-CPP, which would float while ink and adhesive would sink. An alternative approach might be to use a washable adhesive (such as a water-based compostable adhesive) in combination with the barrier coating of the present invention applied on the OPP side. But, the downside of that approach would be potentially lesser barrier properties and inferior lamination adhesive properties, compared to typical solvent based or solvent-free laminations used in flexible packaging. In a further embodiment, it is possible to design a barrier coating as a vacuum metallization primer, to be applied on the CPP before the Al vacuum deposition. That way, the Al layer could also be removed, leaving a clear CPP and OPP film behind after delamination.

The technology described in the present invention helps create more recyclable mono- and multi-material structures. Some applications will be illustrated in the following examples.

However, those skilled in the art would understand that the technology may be applied to a broader range of applications in food, household, or industrial packaging applications, where the delamination layer(s) may be applied by different methods and in different locations of the structure to help achieve the desired separation and help improve recycling.

In a further embodiment, one or more additional layers of polymeric film substrate can be included in the laminate structure to form a "triplex" or "quadruplex" (etc.) structure. FIGS. 3 to 6 illustrate potential examples of a triplex structure.

The recycled polymeric materials which have been separated from other contaminants, such as inks, adhesives, and other incompatible polymers, can potentially be used for virtually any purpose where the corresponding virgin resin is used (e.g. for making new laminates, packages, garbage bags, etc.). In some instances, those materials could be used to produce films or new containers that may be used to package food. Recyclates containing compatible inks and/or adhesives, and no other incompatible resin, may be collected, extruded, and sold as mixed color recycled resin for use in lower value applications. On the other hand, non-recyclable structures containing incompatible materials will most like be landfilled or used for their energetic value, unless the burning of the structure can generate toxic byproducts (e.g. emission of dioxine from burning PVdC coated films, emission of NOx or HCN from burning nitrogen containing materials).

Applicant notes that there are many ways to provide a lamination structure, and a package made therefrom, but the present invention provides a method to create more readily recyclable structures, which will help better separate the layers of a packaging structure into cleaner, and potentially higher value, recycling streams for future re-use as part of the circular economy. The method relies on the use of a strategically located thin separation layer coating enabling delamination in hot water and/or caustic solution, while maintaining the necessary end use performance requirements for the structure during its use, and, when the separation layer coating is a barrier coating, further boosting barrier properties. The separation layer coating is specially engineered to provide the right balance of properties during the useful life of the laminate/packaging structure, and optimize recyclability. The separation layer coating may be applied as a full solid continuous layer, or pattern printed. The method can be applied to multi-material (heterogenous) structures, or mono-material (homogenous) structures. The preferred separation layer coating will enable a complete delamination in less than 30 minutes in hot water (washing solution), preferably in less than 10 minutes, and most preferably in less than 5 minutes. Ideally, the hot water washing solution is at a temperature between 65° C. and 85° C. The washing solution may optionally contain a surfactant such as Triton X100, or other surfactant commonly used in recycling wash systems, and/or the washing solution may be a caustic solution, for example a 1% to 3% NaOH solution. In certain embodiments, the washing solution may include one or more organic solvents.

In certain embodiments, the laminate film structure, or package or container comprising the laminate film structure, is shredded prior to the washing step of a recycling process.

In certain embodiments, the sealing step in the method of forming the laminate structure is selected from the group consisting of heat sealing, ultrasonic sealing, induction sealing, or adhesive sealing.

In certain embodiments, a laminate adhesive is applied as a layer in the laminate film structure to form the laminate structure. In other embodiments, the laminate adhesive is replaced by a thermal extrusion lamination process.

In some embodiments, the laminate structure further comprises one or more of the following:

(a) one or more ink layers within the laminate structure; and/or (b) one or more additional layers of separation layer coating within the laminate structure; and/or (c) one or more metallization layers within the laminate structure; and/or (d) an additional polymer film within the laminate structure to form a triplex laminate structure.

In certain embodiments, the separation layer coating is a barrier coating which provides an equal to or greater than 10-fold reduction in oxygen transmission rate (OTR) compared to uncoated film. The separation layer coating may be flood coated onto the substrate or pattern applied in registration with the inks/package design away from the outer edge of the laminate and heat seal areas.

The present invention also provides a laminate film structure or package produced by the method disclosed herein. In preferred embodiments, the laminate film structure or package structure is recyclable. The package of the present invention can be in the form of a pouch, sachet, thermo-formed tray, lidded container, pot, capsule, or pod.

The present invention also provides a polymeric article produced using the recycled polymer obtained using the methods disclosed herein.

The basis of the present invention is adjusting the formulation of the separation layer coating so that the polymer of the separation layer coating will intermingle with the polymer of the substrate, but also be soluble in the washing solution, for example, hot water and/or hot caustic solution. This is described below in terms of the Hansen Solubility Parameters, and the Flory-Huggins parameter.

Hansen solubility parameters were developed by Charles M. Hansen in 1967 (for information see www.hansen-solubility.com). Solubility is the degree to which two liquids, or a solid and a liquid, can produce a homogenous mixture. The core concept comes from the well-known idea of "like dissolves like," which, in itself, goes back to the even more fundamental concept of "polar-polar" and "nonpolar-nonpolar" interactions in atoms and molecules. The latter further stems down to the cohesion energy between the molecules of materials. The square root of the density of cohesive energy is defined as the total solubility parameter $$\delta_{total} = \sqrt{\frac{E_{total}}{V}}$$

where $E_{total}$ is the total cohesive energy per mole or the total energy of vaporization per mole in J/mol and V is the molar volume in (m$^3$/mol) and $\delta_{total}$ is in (MPa)$^{1/2}$. The total cohesive energy (energy of vaporization) of a liquid consists of three parts, which arise from: (atomic) dispersion forces, $E_D$, (molecular) permanent dipole-permanent dipole forces, $E_P$, and (molecular) hydrogen bonding (electron exchange) forces, $E_H$, therefore:

$$E_{total} = E_D + E_P + E_H$$

This leads to the corresponding solubility components as following.

$$E_{total}/V = E_D/V + E_P/V + E_H/V$$

$$\delta_{total}^2 = \delta D^2 + \delta P^2 + \delta H^2$$

$\delta D$, $\delta P$, and $\delta H$ are the Hansen Solubility Parameters (HSP). Rather than rely on simplistic ideas of "hydrophilic/lipophilic" or "polar/non-polar," HSP uses three parameters. The three components of solubility, viz., (HSP) Hansen solubility parameters ($\delta D$, $\delta P$, $\delta H$) set up a three dimensional solubility space. Each solvent and polymer has its own set of HSP, i.e., ($\delta D$, $\delta P$, $\delta H$) that defines its location in the 3D solubility space.

SD is the "dispersion" parameter, which correlates with the polarizability of a molecule, which in turn correlates with refractive index and van der Waals forces (see "Hansen Solubility Parameters (HSP)|Practical Adhesion Science|Prof Steen Abbott" at https://www.stevenabbott.co.uk/practical-adhesion/hsp.php). Molecules like methanol have few polarizable electrons, so SD is low, but aromatics like toluene have more polarizability, and SD is higher. Similarly, chlorinated solvents have a high SD because of the polarizable halogen electrons.

$\delta P$ is the "polar" parameter, and correlates with our intuitions about polar groups, such as —OH or —C=O. Methanol and acetone therefore have a relatively high $\delta P$, and toluene has a low $\delta P$ value.

$\delta H$ is the "hydrogen bonding" parameter, and is obvious in terms of molecules such as methanol. However, molecules such as acetone have a modest $\delta H$ because the C=O is an acceptor for hydrogen donors.

Every solvent and polymer can be assigned its HSP. If the HSP values are similar, then the solvent(s) and polymer(s)

are compatible, while if they are dissimilar, then they are non-compatible. This encapsulates the intuition that "like attracts like." We can easily calculate how alike two molecules, 1 and 2, are from their HSP Distance (Ra), defined as:

$$Ra^2 = 4 \times (\delta D1 - \delta D2)^2 + (\delta P1 - \delta P2)^2 + (\delta H1 - \delta H2)^2$$

Clearly, if all three parameters for 1 and 2 are very close, then Ra is small, and mutual solubility/compatibility is high. If one or more values differ greatly, then the Distance is large, and mutual solubility is low. The HSP distance corresponding to compatible/soluble materials may vary depending on the material. Polymers have an extra significant solubility number, called "Solubility Radius" or "Radius of Interaction" designated by "R" or "Ro." The radius of interaction of a polymer with HSP ($\delta D_p$, $\delta P_p$, $\delta H_p$) defines a sphere in the solubility space, called the solubility sphere. The radius of the sphere of solubility is calculated as (MPa)$^{1/2}$. Therefore, the complete set of solubility parameters for a polymer consists of four parameters ($\delta D_p$, $\delta P_p$, $\delta H_p$, Ro) rather than three for a solvent or solvent blend. A polymer will be soluble in a solvent or solvent blend if the solvent or solvent blend's location in the 3D solubility falls within the solubility sphere of the polymer. To determine if a solvent/blend's solubility location in the 3D solubility space falls inside the solubility sphere of the polymer, the distance of the solvent/blend location and the center of the polymer's center ($D_{(S-P)}$) is determined and compared with the polymer radius of interaction.

$$Ra^2 = 4 \times (\delta D1 - \delta D2)^2 + (\delta P1 - \delta P2)^2 + (\delta H1 - \delta H2)^2$$

$$RED = (Ra)/Ro$$

Note that because the distance is calculated as a squared value, $\delta D1$, $\delta P1$ and $\delta H1$ can be the HSP of the hot water/caustic solution, and $\delta D2$, $\delta P2$, $\delta H2$ can be the HSP of the polymer, or vice versa (a squared value of a number is an absolute value whether the difference is positive or negative). RED is called "Relative Energy Difference." A smaller RED indicates that the solvent/blend is more likely to dissolve the polymer. For example, if the ratio of the HSP distance Ra to Ro (RED) is less than 1, then the materials are likely to be soluble/compatible. Thus, for the present invention, the polymer used for the separation coating composition will typically be chosen so that hot water and/or a hot caustic solution falls within the solubility sphere of the polymer, because these washing solutions are the ones most commonly used during recycling. However, the washing solution is not so limited, and any appropriate washing solution can be used, depending on the circumstances.

Compatible polymers will "intermingle" or "entangle." The extent of intermingling depends on how "like" they are. This is determined by calculating the Distance using the HSP parameters. The HSP parameters of two polymers, and the HSP Distance between them, has a big impact on "adhesion."

The polymer solubility is generally considered when assessing polymer blends. In this context, the Flory-Huggins $\chi$ parameter related to polymer solubility is calculated via:

$$\chi = MVol * Distance^2 / 4RT$$

where MVol is the molar volume and RT is the usual gas constant times temperature term. For polymer-polymer intermingling (rather than complete mutual solubility which is hard to achieve) the $\chi$ parameter can be used to calculate the distance two polymers can reach across the interface, with a lower $\chi$ value giving a greater possibility of intermingling. In other words, the HSP Distance Ra is a good guide to polymer intermingling even if they are a less good guide to polymer miscibility.

Although it is well-known that most polymers (at high MWt) are immiscible, at an interface between them the distance that the polymer chains can intermingle can be significant—even for polymers that are not very close. The intermingle distance d is based on the "statistical bond length" (Kuhn length) which for simplicity here can be taken to be equivalent to 5 C—C bond lengths, i.e. 0.7 nm. and is given by the Helfand formula:

$$d = b/(6\chi)^{0.5}.$$

The transformation of $\chi$ from Distance uses a value of 50000 for MVol of the polymers.

Professor Steve Abbott discusses the Flory-Huggins theory related to intermingling/adhesion in his Hansen HSPiP e-book, and also on his website at https://www.stevenabbott.co.uk/practical-solubility/polymer-blends.php and other links related to polymer solubility and adhesion science. The discussion below uses the HSP parameters, but one of ordinary skill in the art would understand that it would also be possible to use the Flory-Huggins parameters to assess polymer compatibility, and polymer solvent solubility.

The above theory and practical applications are well documented in the work of Professor Steve Abbott. The HSP parameters as well as the parameters cited above can be calculated using the HSPiP software or the online apps he developed (see: Hansen Solubility Parameters (HSP)|Practical Adhesion Science|Prof Steven Abbott).

The HSP parameters used in the tables and calculations below were obtained either from the online calculator at Hansen Solubility Parameters (HSP)|Practical Adhesion Science|Prof Steven Abbott, or the HSPiP database, or both. The materials in the online calculator are a subset of the HSPiP database, and are therefore from the same source.

Assessing the distance of polymeric film substrates from each other serves multiple purposes. For example, if the distance between the polymeric substrates is close, then the compatibility of the polymers may facilitate recycling. Or, a laminate produced by extrusion (e.g. melt extrusion) will have a greater bond strength if the laminated polymer films have a close distance as calculated using HSP parameters. The importance of the HSP parameters for the resins is in relation to mechanical recycling applications. In mechanical recycling, the recovered film(s) is (re-)extruded to make new products. Knowing the HSP values of the films used in the structure will help determine if the films tell you how important it is to separate the films to avoid compatibility issues during recycling. Inks and adhesive may represent a small fraction of the overall structure. Examples from the online calculator are listed below as "Resin name" ($\delta D$; $\delta P$; $\delta H$) with the values expressed in MPa$^{1/2}$ Polyethylene (16.9; 0.8; 2.8)
Polypropylene (18.0; 0; 1)
PET (18.2; 6.4; 6.6)

Nylon (17.4; 9.9; 14.6)
Polystyrene (18.5; 4.5; 2.9)

From the above values, calculated using the online calculator, the Ra (HSP) distance between Polyethylene and Polypropylene gives a value of 3.0 which is relatively small and therefore indicates compatibility. This is further supported by the other parameters $\chi=0.04$ and a fairly long intermingling distance d of 1.36 nm. On the other hand, the Ra value for PET and Polyethylene is much higher with a calculated Ra value of 7.2 and $\chi=0.27$ and d=0.56 nm illustrating a much poorer compatibility. In certain embodiments, the Ra between the substrates polymers is about 3 to about 10, and they are compatible. Compatible substrates may be able to be recycled together, or formed into an extrusion laminate. In other embodiments, the polymer substrates are heterogenous, and have a Ra of about 10 or greater between them. Preferably, for heterogenous substrates the density of the material is such that they can be separated gravimetrically during recycling. An example of that is the PET/LDPE example where the LDPE/adhesive/ink layer floats, and can be skimmed, while the clean PET film falls to the bottom of the recycling vessel.

More detailed HSP tables may be found in "Handbook of Solubility Parameters and other cohesion parameters" by Alan F. M. Barron, ed. CRC press, published by Taylor and Francis (2$^{nd}$ ed., 1991), as well as in various e-books published by Prof. Steven Abbott and available through the website www.hansen-solubility.com.

In certain embodiments, the present invention provides a method of preparing a recyclable packaging laminate structure intended for a recycling process involving a washing step with a solvent having certain HSP parameters, wherein the RED of the polymer of the separation layer coating and the washing solvent is less than 1 under recycling conditions.

In some embodiments, the film substrates of the laminate structure will be comprised of homogenous polymers. The Ra between homogenous polymers is less than 5, and preferably less than 4. In this case, when appropriate, the film substrates of the laminate structure may be recycled together.

In other embodiments, the film substrates of the laminate structure will be comprised of heterogenous polymers. In that case, the distance, Ra, between the polymers is large enough that they will not intermingle, or will only intermingle for a very short distance. The Ra between heterogenous polymers is greater than about 5, preferably greater than 10, and more preferably greater than 20. Note that the polymers will not be soluble one in another, and the RED between the polymers will be much greater than 1. And, the density of the materials is such that they can be separated gravimetrically. An example of this type of laminate structure in where one film substrate is made of PET, and the other film substrate is made of LDPE. During recycling, after delamination, the LDPE/adhesive/ink layer floats, and can be easily skimmed, while the clean PET film falls to the bottom of the recycling container.

Note that during recycling, a variety of washing solutions may be used. Generally, a hot water or hot caustic solution (e.g. 1% to 3% NaOH) is used, but in certain circumstances an organic solvent may be used. If an organic solvent is used, it must be carefully chosen to ensure that it does not dissolve the polymeric film substrate. The HSP parameters for representative hot water washing solutions are listed in Table 1. The HSP values for other solvents can be calculated using the HSPiP software. Values for water are from Table A.1 (pg. 482) of Charles M. Hansen, *Hansen Solubility Parameters:*

*A User's Handbook,* 2nd Edition, 2007. Note that there are three sets of HSP parameters for water: single molecule derived from the energy of vaporization of water at 25° C. (δD=15.5, δP=16.0, and δH=42.3); based on a correlation of various solvents in water, where good solvents are soluble to more than 1% in water (15.1, δP=20.4, δH=16.5, and Ro=18.1); and a set of data based on a correlation of total miscibility of the given solvents in water (SD=18.1, SP=17.1, SH=16.9, and Ro=13.0). Note that all values are for HSP measured at 25° C. The values for water in Table 1 below are the values for water based on total miscibility at 25° C. The values for water at higher temperatures are calculated as described below. Note that δH of water decreases as temperature increases, resulting in a smaller distance from polymers as temperature increases, and greater solubility of a polymer in water. Thus, although a calculation of RED for a given polymer and water may be large at 25° C., the RED will likely decrease as the temperature is raised (e.g. to 85° C. as in the washing step of recycling), and the polymer will be more soluble. With change in temperature, the HSP values of small molecules will generally change (e.g. water and other solvents), but the HSP values of polymers generally remain constant across temperatures (see HSP and Temperature—Hansen solubility parameters at https://www.hansen-solubility.com/HSP-science/HSP-T.php).

The HSP values for water at increasing temperatures was calculated according to the following equations, using the online calculator (HSP and Temperature—Hansen solubility parameters at https://www.hansen-solubility.com/HSP-science/HSP-t.php):

$$\delta D_T = \delta D * (1 - (\Delta T * \alpha * 1.25)$$

$$\delta P_T = \delta P * \left(1 - \left((\Delta T * \alpha)/2\right)\right)$$

$$\delta H_T = \delta H * \left(1 - \left(\Delta T * \left((0.00122 + \alpha)/2\right)\right)\right)$$

where T is the temperature of the water; ΔT is the change is temperature from 25° C.; and α is the thermal expansion coefficient of water at temperature T (the thermal expansion coefficient of water is different at different temperatures). For simplicity, the value for a is set at 0.0007/K on the online calculator at the website HSP and Temperature listed above. The values in Table 1 are calculated using the calculator provided at the website HSP and Temperature listed above. If desired, more specific values for a can be found at the Engineering Toolbox website at https://www.engineering-toolbox.com/water-density-specific-weight-d_595.html):

$$\text{at } 50° \text{ C. } \alpha = 0.000454/K$$

$$\text{at } 60° \text{ C. } \alpha = 0.000516/K$$

$$\text{at } 80° \text{ C. } \alpha = 0.000621/K$$

$$\text{at } 85° \text{ C. } \alpha = 0.000644/K$$

$$\text{at } 90° \text{ C. } \alpha = 0.000666/K$$

$$\text{at } 95° \text{ C. } \alpha = 0.000687$$

TABLE 1

HSP of typical washing solution (calculated using the online calculator)

| | Hansen solubility (MPa)$^{1/2}$ | | |
|---|---|---|---|
| Washing solution | δD dispersion | δP polar | δH H-bonding |
| Water at 25° C. | 18.1 | 17.1 | 16.9 |
| Water at 50° C. | 17.7 | 17.0 | 16.2 |
| Water at 60° C. | 17.5 | 16.9 | 16.0 |
| Water at 80° C. | 17.2 | 16.8 | 15.4 |
| Water at 85° C. | 17.1 | 16.7 | 15.3 |
| Water at 90° C. | 17.1 | 16.7 | 15.2 |
| Water at 95° C. | 17.0 | 16.7 | 15.0 |

The HSP parameters for some polymers are listed in Table 2. These values were obtained from the online calculator at Hansen Solubility Parameters (HSP) Practical Adhesion Science Prof Steven Abbott, or the HSPiP dataset associated with the HSPiP software, or both. The values provided in the online calculator are a subset taken from the HSPiP dataset, therefore they are from the same source. In general, δD, δP, and δH values are from the online calculator at Hansen Solubility Parameters (HSP)|Practical Adhesion Science|Prof Steven Abbott, and the polymers are cross-referenced in the HSPiP database to obtain the Ro value. Note that there could be multiple HSP values available for certain materials, depending on how they have been determined and/or if they are an average of multiple results published or single results. Therefore, Table 1 is provided so that it is clear upon which values we base our calculations. Alternative tables may be used if obtained from trusted sources. If alternative sources are used, we recommend that in that case all calculations be completed with data from that reference, rather than mixing references, and preferably using values determined with similar experimental methods for consistency.

TABLE 2

HSP of selected polymers

| | Hansen solubility (MPa)$^{1/2}$ | | | |
|---|---|---|---|---|
| Polymer | δD dispersion | δP polar | δH H-bonding | Ro |
| *Poly(vinylchloride), PVC | 18.8 | 9.2 | 6.3 | 8.0 |
| Polyethylene, PE | 16.9 | 0.8 | 2.8 | 8.0 |
| Polypropylene, PP | 18.0 | 0 | 1.0 | 8.0 |
| Nylon 66 (a polyamide) | 17.4 | 9.9 | 14.6 | 8.0 |
| Poly(ethylene terephthalate), PET | 18.2 | 6.4 | 6.6 | 8.0 |
| Poly(ethyl methacrylate), PEMA | 17.6 | 9.7 | 4.0 | 8.0 |
| Poly(methacrylic acid) (PMAA) | 25.6 | 11.2 | 19.6 | 20.3 |
| Poly(methyl methacrylate), PMMA | 18.6 | 10.5 | 5.1 | 9.5 |
| Poly(acrylonitrile), PAN | 22.4 | 14.1 | 9.1 | 8.0 |
| Polystyrene, PS | 18.5 | 4.5 | 2.9 | 8.0 |
| Polysulfone | 16.0 | 6.0 | 6.6 | 8.0 |
| Poly(vinyl alcohol), PVOH | 15.0 | 17.2 | 17.8 | 10.2 |
| Poly(vinyl acetate), PVA | 17.6 | 2.2 | 4.0 | 8.0 |
| Poly(vinyl butyral) | 18.6 | 4.4 | 13.0 | 8.0 |
| Polyurethane, PU | 18.1 | 9.3 | 4.5 | 8.0 |
| *Polyvinylidene chloride, PVdC (110° C. solubility) | 17.6 | 9.1 | 7.8 | 3.9 |
| #Ethylene vinyl alcohol, EVOH | 15.5 | 13.0 | 13.0 | 8.0 |
| *Ethylene-vinyl alcohol, EVOH Soluble resin Polyamide | 20.5 | 10.5 | 12.3 | 7.3 |
| Polycarbonate, PC | 18.2 | 5.9 | 6.9 | 8.0 |
| Polycaprolactone | 17.7 | 5.0 | 8.4 | 8.0 |
| Epoxy | 17.4 | 10.5 | 9.0 | 7.9 |

TABLE 2-continued

HSP of selected polymers

| | Hansen solubility (MPa)$^{1/2}$ | | | |
| Polymer | $\delta$D dispersion | $\delta$P polar | $\delta$H H-bonding | Ro |
| --- | --- | --- | --- | --- |
| Polyvinylidenefluoride, PVF | 17.0 | 12.1 | 10.2 | 8.0 |
| Polyphenyleneoxide | 17.9 | 3.1 | 8.5 | 8.0 |
| Polysilicone | 17.2 | 3.0 | 3.0 | 8.0 |
| Polyethersulfone | 19.0 | 11.0 | 8.0 | 8.0 |
| Polyoxymethylene, PON | 17.2 | 9.2 | 9.8 | 8.0 |
| *Polyvinylpyrrolidone, PVP | 18.1 | 10.0 | 18.0 | 8.0 |
| CyclicOlefinCopolymer, COC | 18.0 | 3.0 | 2.0 | 8.0 |
| Polyethylene oxide (PEO, PEG) | 17.0 | 10.0 | 5.0 | 8.0 |
| Polypropylene oxide (PPO, PPG) | 16.5 | 9.0 | 7.0 | 8.0 |
| Polylactic acid (PLA) | 18.6 | 9.9 | 6.0 | 10.7 |

*all values from the HSPiP database.
$\delta$D, $\delta$P, and $\delta$H are from the online calculator, but these values are not provided in the database, therefore assigned an Ro of 8.0, as this is the default Ro value for many polymers.

Adhesion of Separation Layer Coating to Web Substrates and Removal by Washing Solution Adhesion of a coating to a web substrate can be varied by choosing a polymer as a binder for preparation of the coating that is more likely to intermingle with the polymer of the web substrate. The Ra value between the two polymers indicates the compatibility, and therefore the intermingling, of the two polymers.

Using the HSP values in Table 2, the distance, Ra, between various substrate polymers and polymers that may be used in the separation layer coating compositions of the present invention were calculated (using the online calculator at Hansen Solubility Parameters (HSP)|Practical Adhesion Science|Prof Steven Abbott). The data are shown in Table 3.

TABLE 3

Calculated Ra of polymer substrate and
polymer of barrier coating composition

| | Calculated Ra of barrier polymer | | | | |
| Polymer web substrate | PMMA | PVOH | #EVOH | *EVOH Sol | PU |
| --- | --- | --- | --- | --- | --- |
| PE | 10.5 | 22.5 | 16.1 | 17.18 | 9.0 |
| PET | 4.4 | 16.8 | 10.7 | 7.12 | 3.6 |
| PP | 11.3 | 24.8 | 18.4 | 16.93 | 9.9 |
| Nylon 66 (a polyamide) | 9.8 | 9.3 | 5.2 | 6.64 | 10.2 |

EVOH parameters from the online calculator.
*EVOH Sol parameters from HSPiP database.

The data above show that PMMA is the most similar to PET, and is more likely to intermingle with PET web substrates, increasing adhesion. PVOH and EVOH are closer to Nylon 66 (a polyamide), and is more likely to intermingle with polyamide substrates, increasing adhesion. PU is the closest to PET, and is likely to intermingle with PET substrates, increasing adhesion.

Although the separation layer coating must adhere well to the substrate, and be resistant to removal by normal exposure to water and solvents, during the lifetime use of the article comprising the web substrate and separation layer coating, it must also be somewhat soluble in hot water or hot caustic solution during recycling. Solubility of the separation layer coating polymer in hot water and hot caustic washing solutions can be estimated by calculating the relative energy difference (RED) between the polymer and the washing solution. Preferably, the RED between the polymer of the separation layer coating and the washing solution is less than 1. If the RED is greater than 1, the washing solution can be adjusted, by, for example, adding a caustic (e.g. NaOH), adding an organic solvent, or adding a surfactant. Some examples of the calculated RED between barrier polymers and the washing solution are shown in Table 4.

TABLE 4

RED between barrier polymer and washing solution

| | RED | | | | |
| Washing solution | PMMA | PVOH | #EVOH | *EVOH Sol | PU |
| --- | --- | --- | --- | --- | --- |
| Water at 25° C. | 1.47 | 0.61 | 0.96 | 1.28 | 1.83 |
| Water at 85° C. | 1.30 | 0.48 | 0.68 | 1.33 | 1.66 |
| Water at 95° C. | 1.27 | 0.48 | 0.65 | 1.33 | 1.63 |

*all values from HSPiP database.
$\delta$D, $\delta$P, and $\delta$H from the online calculator, and Ro default value of 8.0.

Although intuitively it would seem that higher temperatures always result in improved solubility of polymers, this is not always the case. This is a result of the fact that the HSP values for small molecules (e.g. solvents) change while HSP values for polymers generally do not. Increasing the temperature of small molecules generally decreases HSP values. The HSP-temperature effect can either increase or decrease solubility. For example, we may have two solvents that are both bad solvents for a given polymer, where one is outside the sphere of the polymer because it has high HSP values, and the other is outside the sphere, or just inside the sphere, because it has low HSP values. Decreasing the HSP values of the solvent which starts with high HSP values will take the solvent into the sphere and increase solubility. Conversely, decreasing the HSP values of the solvent which starts with low HSP values will take the solvent further from the sphere, and decrease solubility. This can be seen in the above table, where *EVOH Sol is more soluble in water at 25° C. that at 85° C. and 95° C. However, note that, considering the relative experimental uncertainty around HSP values, a difference in RED value of 0.05 between hot and cold water for EVOH sol cannot be interpreted as a statistically significant difference. There are instances where heat and/or time will make a difference. In that case, scientists may determine the HSP parameters for a certain material after a certain number of hours rather than the instant solubility. Heat and/or time could improve the solubility of a material and may be leveraged in a recycling operation to help better solubilize the separation layer coating.

Water is used as a typical example of a washing solution in the present description.

However, one of ordinary skill in the art will understand that, if a polymer is not sufficiently soluble in water, the washing solution can be modified by adding other solvents, such as organic solvents, to create a solvent blend, or by adding other components. For example, other components that might be added include sodium hydroxide (NaOH), or one or more surfactants. Although addition of small amounts of NaOH (e.g. 1% to 3%) is unlikely to have a large impact on the HSP parameters of an aqueous solution, the NaOH will typically act by chemically attacking acid groups in the polymer, therefore changing the solubility characteristics of the target polymer, making it more likely to solubilize or disperse in water. Addition of surfactants is more likely to change the HSP parameters of the aqueous washing solution.

Note that it is common in recycling operations to add a surfactant in the water which could help lift the barrier coating away from the films even if the RED between coating and water is >1. Surfactants can be construed as materials with 2 sides (lipophilic side and hydrophilic side) having different HSP values leading to an "average" HSP value. More details about HSP of surfactants are included here: https://pirika.com/ENG/HSP/E-Book/Chap21.html. The HSP parameters of washing solutions with different blends and components can be calculated using HSPiP software.

For the purposes of the present invention, to elicit delamination at the selected web substrate, the Ra between the web substrate and the polymer used in the separation layer coating composition should be less than 25, to enable intermingling, but greater than 3, to enable delamination. That is, the Ra should be such that the polymer of the first substrate and the polymer of the separation layer coating intermingle to obtain a high enough adhesion of the separation layer coating to the first polymeric substrate for the laminate structure to remain intact during the useful lifetime of the package, while at the same time providing low enough adhesion to allow for removal of the coating from the first polymeric substrate during a washing step of a recycling process. Preferably, the Ra between the polymer of the substrate and the polymer of the separation layer coating is from about 3 to about 25; or about 3 to about 20; or about 3 to about 15; or about 3 to about 10; or about 3 to about 5; or about 5 to about 25; or about 5 to about 20; or about 5 to about 15; or about 5 to about 10; or about 10 to about 25; or about 10 to about 20; or about 10 to about 15.

Ideally, the solubility of the polymer in the separation layer coating in the washing solution should be adequate to enable removal of the separation layer coating from the selected web substrate in the washing step of recycling. In this context, a RED of less than 1 between the washing solution and the separation layer coating polymer (defined as the primary binder resin and/or blend of resins in the coating) is desired. However, particularly when organic solvents are used, it is important that the RED between the polymer of the polymeric film substrate and the washing solution be as large possible, and at least greater than 1, so that the polymeric film itself does not dissolve in the washing solution. In a preferred embodiment, the RED between the washing solution and the polymers of all of the polymeric film substrates in the lamination structure be as large as possible, and at least greater than 1.

Laminate Structures

FIG. 1 shows a duplex laminate structure, where a laminate structure is formed using a polyester film (PET) first substrate, coated with a delamination barrier coating, inks, adhesive, and laminated to polyethylene (PE) sealant web (second substrate). The barrier coating provides the delamination layer, allowing clean PET flake (first substrate) to be recovered during recycling.

Figure 2:
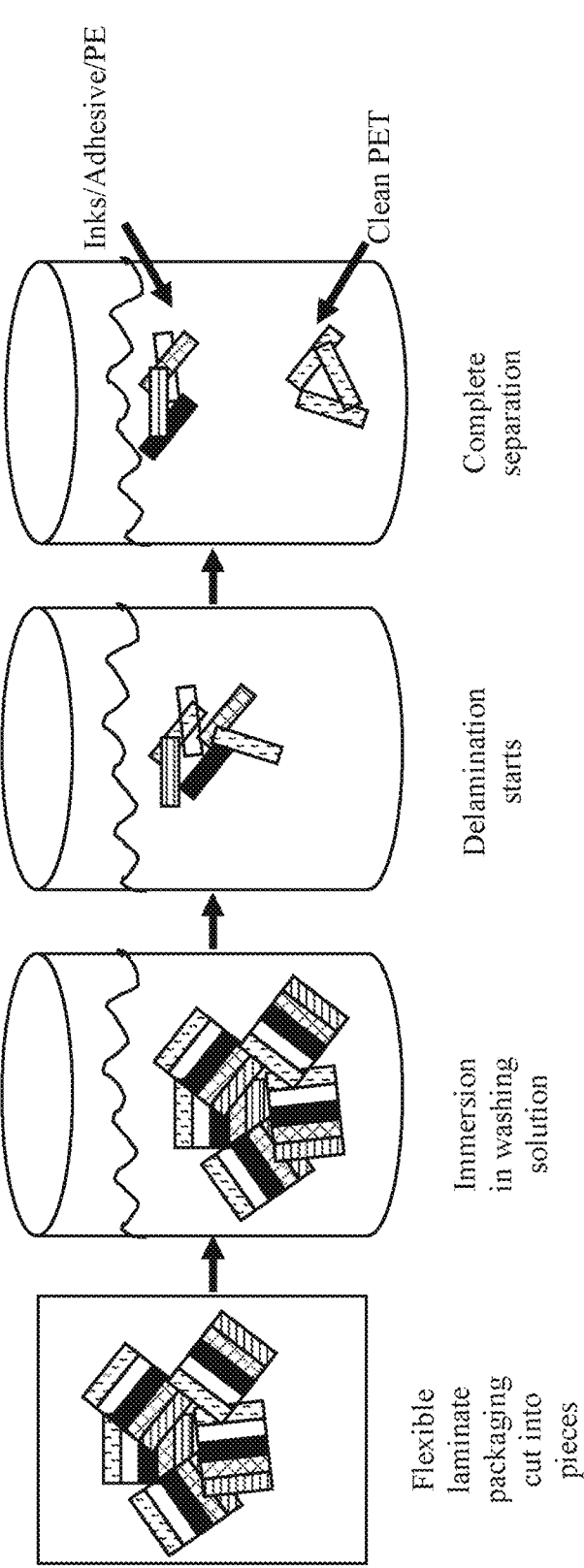
FIG. 2 is a schematic showing the recovery of the PET of the first substrate in FIG. 1.

FIG. 2 is a schematic showing the recovery of the PET of the first substrate in FIG. 1. The packaging structure made from the laminate is recycled by shredding the package, immersing the shreds in hot water or hot caustic solution to remove the PET from the other layers, and finally separating the clean PET. The PET recovered can be recycled, and be used for virtually any purpose where virgin PET is used (e.g. for making new polyester films, laminates, packages and containers, or as a resin or co-resin in various applications).

Figures 3, 4:
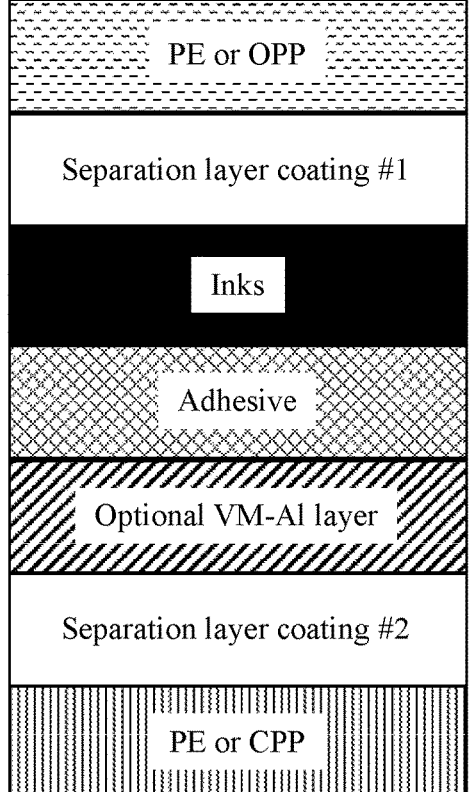
FIG. 3 shows a recyclable triplex structure using chemically compatible substrates in which both of the clean PE, OPP, or CPP films can be separated from the other layers of the laminate.
FIG. 4 shows a recyclable triplex structure with high barrier properties in which clean heat-sealable web film (Film #2) can be separated from the other layers of the structure.

FIG. 3 shows a recyclable triplex structure using chemically compatible substrates in which clean PE, OPP, or CPP films can be separated from the ink, adhesive, and optional vacuum-metalized aluminium layer. "Separation Layer Coatings #1 and #2" indicate a separation layer coating of this invention designed to also enable delamination in hot water/caustic.

FIG. 4 shows a recyclable triplex structure with high barrier properties in which clean heat-sealable web film (Film #2) can be separated from the print web film (Film #1), inks, adhesive, vacuum metalized film, and adhesive.

Figure 5:
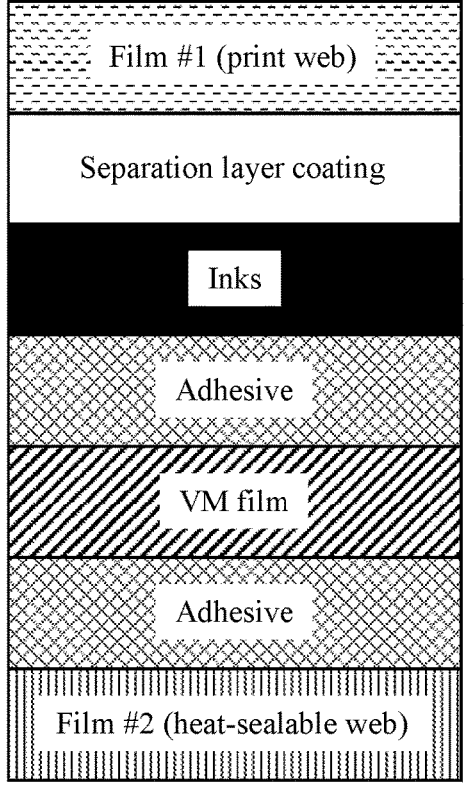
FIG. 5 shows a triplex structure with high barrier properties in which clean print-web film (Film #1) can be separated from the other layers of the laminate.

FIG. 5 shows a triplex structure with high barrier properties in which clean print-web film (Film #1) can be separated from inks, adhesive, vacuum metalized film, and heat-sealable web film (Film #2).

Figure 6:
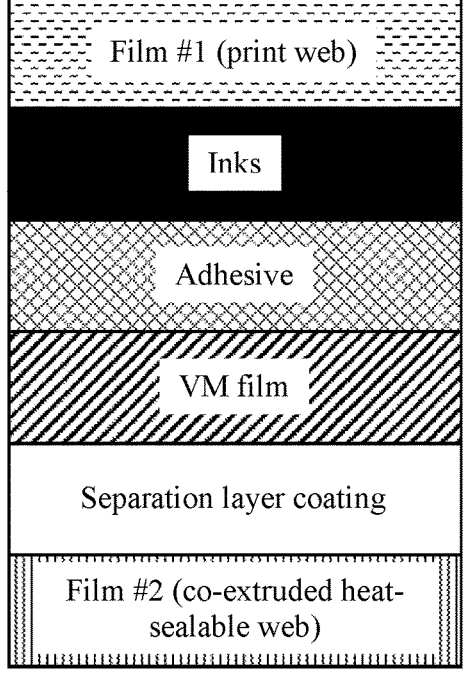
FIG. 6 shows a triplex structure with high barrier properties in which clean heat-sealable web film (Film #2) can be separated from the print web film (Film #1), inks, adhesive, and vacuum metalized film.

FIG. 6 shows a triplex structure with high barrier properties in which clean heat-sealable web film (Film #2) can be separated from the print web film (Film #1), inks, adhesive, and vacuum metalized film.

Figure 7:
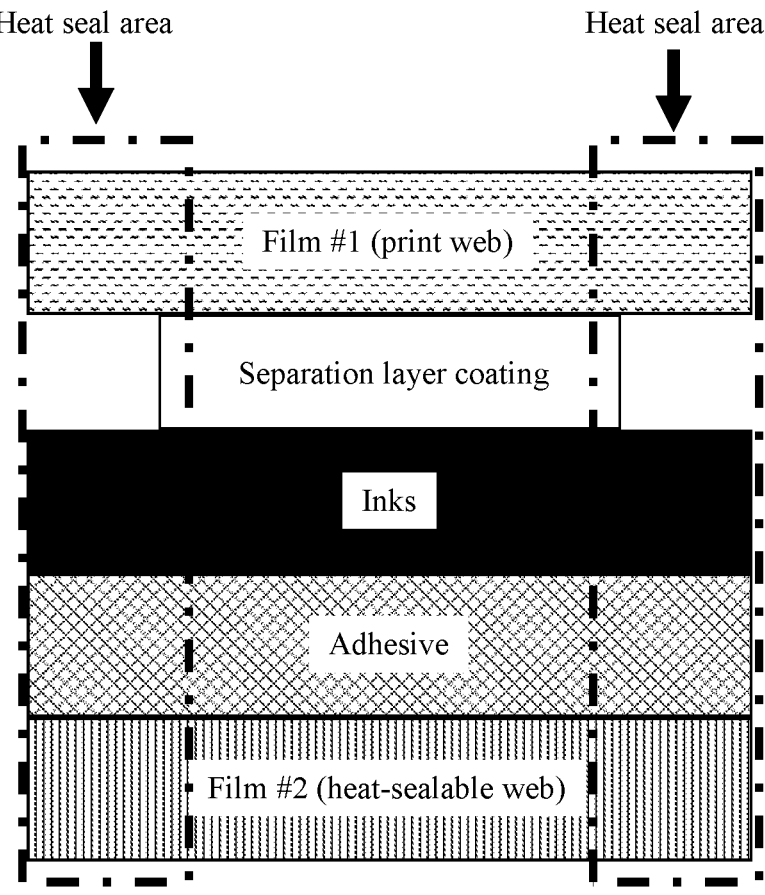
FIG. 7 shows a cross-sectional view of a recyclable laminate structure with pattern printed barrier coating.

FIG. 7 shows a recyclable structure with pattern printed delamination barrier coating in which the barrier coating of the invention is applied and registered to the printing ink graphic design so that it is absent from the edges of the heat-sealable structure and will not cause the structure to unintentionally delaminate prior to shredding and recycling, should the structure be exposed wet storage conditions.

EXAMPLES

The invention is further described by the following non-limiting examples, which further illustrate the invention, and are not intended, nor should they be interpreted to, limit the scope of the invention.

Example 1. Beef Jerky Snack Food Adhesive Laminated Pouch

A beef jerky snack food adhesive laminated pouch comprising a polyester (PET) primary printing web, and low-density polyethylene sealant web (LDPE) was prepared. A separation layer coating (which also acts as an oxygen barrier coating) comprising PVOH solution and nano-clay dispersion was applied at 0.3 g/m$^2$ to 0.5 g/m$^2$ dry-solids coat weight by flexographic or gravure printing to the clear PET film, then over-printed with snack food artwork (inks), and then adhesive laminated to LDPE, such that the coating, inks, and adhesive are all between the outer PET layer and the inner LDPE layer of film. The barrier coating provides an enhanced oxygen barrier in the structure, reducing the oxygen transmission rate (OTR) of PET from 140 cm$^3$/m$^2$/day (ref. Dupont Tejin Films Mylar 12-micron Polyester, 25° C., 45% relative humidity) to equal to or less than 1.0 cm$^3$/m$^2$/day. This type of laminate structure is illustrated in FIG. 1.

When chopped and recycled in hot (~85° C.) water solution with or without caustic (1% NaOH), the PET/LDPE layers delaminate, leaving largely clean PET film and the remaining coating, ink, and adhesive attached to the LDPE film. Contaminated LDPE separates by floating (density 0.91 g/cm$^3$) to the surface, and clean PET sinks in the caustic solution tank due to its higher density (1.37 g/cm$^3$). This process is illustrated in FIG. 2. A comparative laminate structure without the barrier coating layer does not delaminate, and therefore presents a significant recycling problem, and would likely be diverted to landfill.

Example 2. Dry Snack Food Duplex Adhesive Laminated Pouch

A dry snack food duplex adhesive laminated pouch comprising a polyester (PET) primary printing web and low-density polyethylene (LDPE) sealant web is prepared. In this example, a separation layer coating comprising a PVOH solution and an adhesion promoter (polyethyleneimine (PEI)) is applied directly to the corona-treated LDPE at 0.3 g/m² to 0.7 g/m² dry-solids coat weight by flexographic or gravure printing, which is then adhesive laminated to the printed PET film. Coating, inks, and adhesive are all between the outer PET and inner LDPE films. The coating still provides an enhanced oxygen barrier. Depending on the thickness of the barrier coating layer, and the relative humidity used for the test, the OTR of the structure may be below 20 cm³/m²/day, below 10 cm³/m²/day, or even as low as equal to or less than 2 cm³/m²/day. Lower OTR values may be possible by selecting a coating comprising nano-clay silicate particles. When chopped and recycled in hot (~85° C.) water with or without caustic, the PET/LDPE layers delaminate, leaving largely clean LDPE and the remaining coating, ink, and adhesive attached to the PET film. Clean LDPE separates by floating (density 0.91 g/cm³) to the surface, and contaminated PET sinks in the caustic solution tank due to its higher density (1.37 g/cm³).

Example 3. Laminate Structure to Separate Both Web Substrates

The options described in Examples 1 and 2 could be combined, whereby two separation layer coating layers would be applied, one on each layer which needs to be separated. This would not only provide significantly enhanced barrier properties (at or below 0.2 cm³/m²/day in the present example), but also help separate both the top primary web and the sealant web cleanly as clear films, which could then be recycled into more applications—including potentially food packaging applications. This laminate structure is illustrated in FIG. 3, where tie coating #1 and tie coating #2 are barrier coatings.

Example 4. Dry Cereal Duplex Adhesive Laminated Pouch

A dry cereal duplex adhesive laminated pouch comprising a biaxially-oriented polypropylene (BOPP) primary printing web and low-density polyethylene (LDPE) sealant web is prepared. In this example, a separation layer coating, that is also a barrier coating, comprising PVOH solution, PEI adhesion promoter, and silicate clay dispersion, is applied at 0.3 g/m² to 0.5 g/m² dry-solids coat weight to corona-treated BOPP, then overprinted with ink, and adhesive laminated to LDPE, such that coating, inks, and adhesive are all between the outer BOPP layer and the inner LDPE layer of films. Although oxygen barrier is less of a requirement for dry cereal, oxygen barrier is still enhanced over 100-fold from greater than 2,000 cm³/m²/day to less than 10 cm³/m²/day, at 25° C., and 50% relative humidity (RH). When chopped and recycled in hot (~85° C.) caustic (1% NaOH) solution, the BOPP/LDPE layers delaminate, leaving largely clean BOPP, and the remaining coating, ink, and adhesive attached to the LDPE film. This could be advantageous for any subsequent separation process capable of separating BOPP from LDPE, such as an enhanced triboelectric charging and free-fall separator process.

Example 5. Alternative Dry Pouch Laminate Structure

Similar to Examples 1 and 2, and analogous to Example 4, the coating is applied to the opposing corona treated LDPE film surface, and when separated yields largely clean LDPE film, with the remaining coating, ink, and adhesive attached to the BOPP film.

Example 6. Food Wrapper Duplex

A food wrapper duplex adhesive laminated pouch comprising biaxially-oriented polyamide (BOPA) primary printing web, and cast polypropylene (CPP) sealant web is prepared. BOPA/LDPE layers delaminate, leaving largely clean BOPA, and the remaining coating ink, and adhesive attached to the CPP film. Contaminated CPP separates by floating (density 0.895 g/cm³) to the surface, and clean BOPA sinks in the caustic solution tank due to its higher density (1.13 g/cm³).

Example 7. Alternative Food Wrapper Duplex

Similar to Examples 1 and 2, and analogous to Example 6, the barrier coating is applied to the opposing corona treated CPP film surface, and when separated yields largely clean CPP film, with the remaining coating, ink, and adhesive attached to the BOPA film.

The present invention has been described in detail, including the preferred embodiments thereof. However, it will be appreciated that those skilled in the art, upon consideration of the present disclosure, may make modifications and/or improvements on this invention that fall within the scope and spirit of the invention.

The invention claimed is:

1. A method of preparing recyclable packaging laminate film structure, comprising:
   (a) providing a first polymeric substrate and a second polymeric substrate, wherein the polymer of the first substrate has Hansen Solubility Parameters (HSP) of $\delta D_{s1}$ (dispersion), $\delta P_{s1}$ (polar), and $\delta H_{s1}$ (hydrogen bonding);
   (b) applying and curing a separation layer coating composition onto the first polymeric substrate, wherein the separation layer coating composition comprises a polymer, wherein the polymer of the separation layer coating composition has HSP of $\delta D_c$, $\delta P_c$, and $\delta H_c$, and $Ro_c$ (radius of the sphere of solubility);
   (c) wherein the distance in Hansen space between the polymer of the first polymeric substrate and the polymer of the separation coating composition $Ra_{(s1,c)}$ based on the HSP parameters of each polymer is 5 to 25, calculated according to the following equation (1):

$$Ra_{(s1,c)}^2 = 4 \times (\delta D_{s1} - \delta D_c)^2 + (\delta P_{s1} - \delta P_c)^2 + (\delta H_{s1} - \delta H_c)^2$$

(d) applying a lamination adhesive layer either on the same side as the separation layer coating or on the side of the second polymeric substrate; and
   (e) forming a laminate structure wherein the separation layer coating and the adhesive are sandwiched between the first and second substrate;
   wherein the formed laminate is suitable for sealing to itself or to a pre-formed rigid or flexible shape to create a package or container.

2. A method of forming a laminated package or container, comprising:
   (a) providing the laminate film structure of claim 1; and (b) sealing the laminate film structure to itself or to a pre-formed rigid or flexible shape to create a package or a container.

3. A method of obtaining clean pieces of the first polymeric substrate of claim 1 during recycling, comprising:

(a) washing the laminate film structure in a washing solution, wherein the washing solution has HSP of $\delta D_w$, $\delta P_w$, and $\delta H_w$;

(b) wherein the relative energy difference (RED) between the polymer of the separation layer coating and the washing solution is less than or equal to 1, according to equation (2):

$$RED_{c,w} = Ra_{(c,w)}/Ro_c$$

wherein $Ra_{(c,w)}$ is calculated according to equation (3);

$$Ra_{(c,w)}^2 = 4 \times (\delta D_c - \delta D_w)^2 + (\delta P_c - \delta P_w)^2 + (\delta H_c - \delta H_w)^2;$$

(c) wherein the RED between the polymer of the first polymeric substrate and the washing solution is greater than 1, according to equation (4):

$$RED_{s1,w} = Ra_{(s1,w)}/Ro_{s1}$$

wherein $Ra_{(s1,w)}$ is calculated according to equation (5);

$$Ra_{(s1,w)}^2 = 4 \times (\delta D_{s1} - \delta D_w)^2 + (\delta P_{s1} - \delta P_w)^2 + (\delta H_{s1} - \delta H_w)^2;$$

so that the washing solution does not dissolve the polymeric substrate; and (d) separating the first polymeric substrate from the remaining layers of the package or container for recycling.

4. The method of claim 3, wherein the RED between the washing solution and the polymers of all polymeric substrates in the laminate structure is greater than 1.

5. The method of claim 3, wherein the washing solution is hot water, hot caustic solution, an organic solvent, and combinations thereof.

6. The method of claim 5, wherein the washing solution further comprises one or more surfactants.

7. The method of claim 3, wherein the laminate film structure, or package or container comprising the laminate film structure, is shredded prior to the washing step.

8. The method of claim 2, wherein the sealing step is selected from the group consisting of heat sealing, ultrasonic sealing, induction sealing, or adhesive sealing.

9. The method of claim 1, wherein the laminate adhesive is replaced by a thermal extrusion lamination process.

10. The method of claim 1, further comprising one or more of the following:

(a) one or more ink layers within the laminate structure; and/or (b) one or more additional layers of separation layer coating within the laminate structure; and/or (c) one or more metallization layers within the laminate structure; and/or (d) an additional polymer film within the laminate structure to form a triplex laminate structure.

11. The method of claim 1, wherein the separation layer coating composition comprises one or more water-soluble or water-dispersible polymers or copolymers, and optionally one or more fillers or crosslinkers.

12. The method of claim 11, wherein the one or more water-soluble or water-dispersible polymers or copolymers are selected from the group consisting of ethylene vinyl alcohol (EVOH), polyvinyl alcohol (PVOH), amorphous vinyl alcohol, polyacrylic acid and polyurethane dispersion.

13. The method of claim 1, wherein the separation layer coating composition comprises one or more adhesion promoters selected from the group consisting of polyaziridine, polyethylene imine (PEI), polyurethane polyol dispersions, organo-silanes, amino-silanes, acid-functional monomers or polymers, titanates, zirconates or other chelating agents.

14. The method of claim 1, wherein the separation layer coating is an oxygen barrier coating, and provides an equal to or greater than 10-fold reduction in oxygen transmission rate (OTR) compared to uncoated film.

15. The method of claim 1, wherein the outer edges of the laminate structure are heat seal areas, and the separation layer coating is applied as a pattern registered to the printed graphics to exclude the outer area of the heat seal areas.

16. The method of claim 1, wherein the first polymeric substrate and the second polymeric substrate are homogenous, wherein:

(a) the polymer of the first substrate has Hansen Solubility Parameters (HSP) of $\delta D_{s1}$, $\delta P_{s1}$, and $\delta H_{s1}$;

(b) the polymer of the second substrate has Hansen Solubility Parameters (HSP) of $\delta D_{s2}$, $\delta P_{s2}$, and $\delta H_{s2}$;

(c) the distance in Hansen space between the polymer of the first polymeric substrate and the polymer of the second polymeric substrate $Ra_{(s1,s2)}$ based on the HSP parameters of each polymer is less than or equal to 4, calculated according to the following equation (6):

$$Ra_{(s1,s2)}^2 = 4 \times (\delta D_{s1} - \delta D_{s2})^2 + (\delta P_{s1} - \delta P_{s2})^2 + (\delta H_{s1} - \delta H_{s2})^2.$$

17. The method of claim 1, wherein the first polymeric substrate and the second polymeric substrate are heterogenous, wherein:

(a) the polymer of the first substrate has Hansen Solubility Parameters (HSP) of $\delta D_{s1}$, $\delta P_{s1}$, and $\delta H_{s1}$;

(b) the polymer of the second substrate has Hansen Solubility Parameters (HSP) of $\delta D_{s2}$, $\delta P_{s2}$, and $\delta H_{s2}$;

(c) the distance in Hansen space between the polymer of the first polymeric substrate and the polymer of the second polymeric substrate $Ra_{(s1,s2)}$ based on the HSP parameters of each polymer is greater than or equal to 10, calculated according to the following equation (6):

$$Ra_{(s1,s2)}^2 = 4 \times (\delta D_{s1} - \delta D_{s2})^2 + (\delta P_{s1} - \delta P_{s2})^2 + (\delta H_{s1} - \delta H_{s2})^2.$$

* * * * *